March 6, 1945.　　　　E. D. TILLYER　　　　2,370,697
OPTICAL MEANS
Filed Sept. 13, 1940　　　3 Sheets-Sheet 1
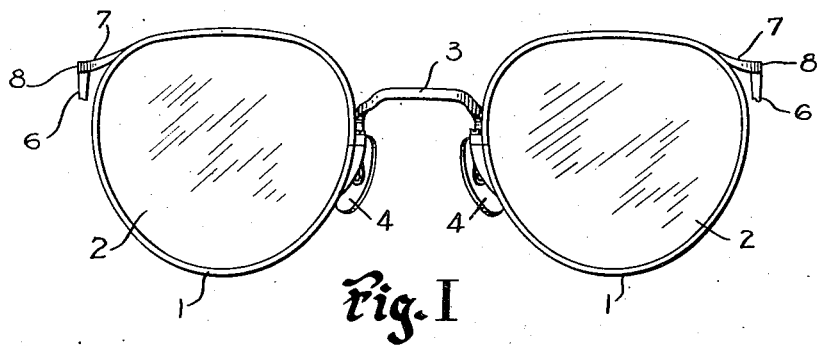
Fig. I
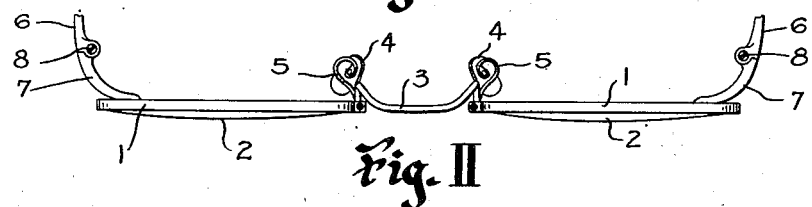
Fig. II
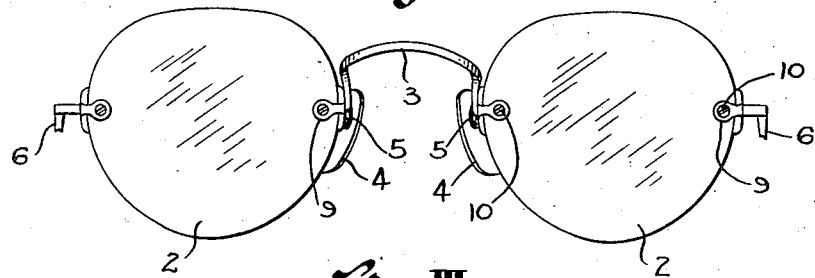
Fig. III
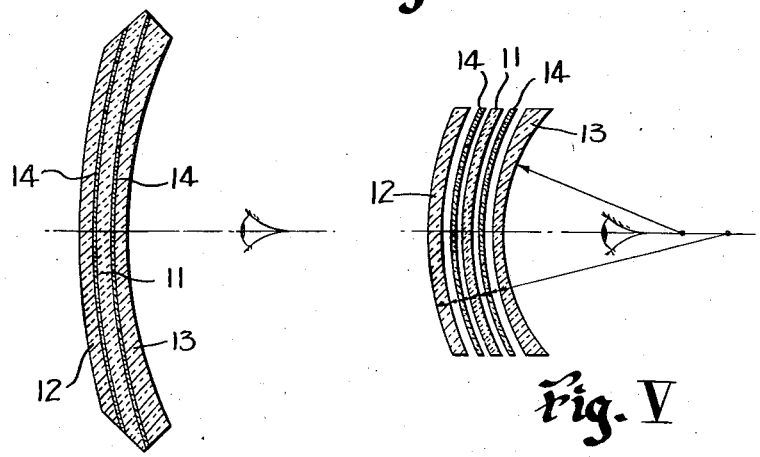
Fig. IV　　　Fig. V
INVENTOR.
EDGAR D. TILLYER
BY
ATTORNEY.

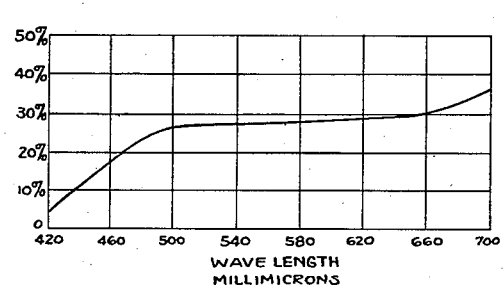
Fig. VI
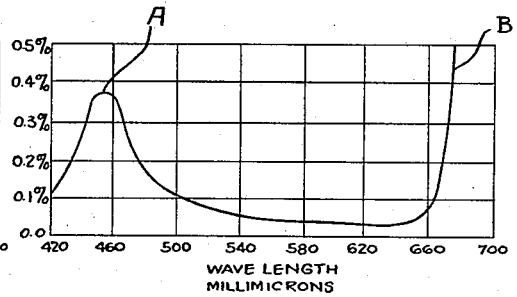
Fig. VII
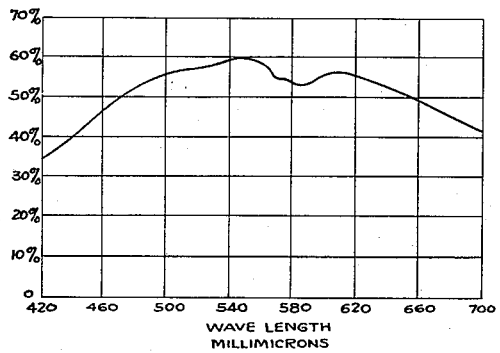
Fig. VIII
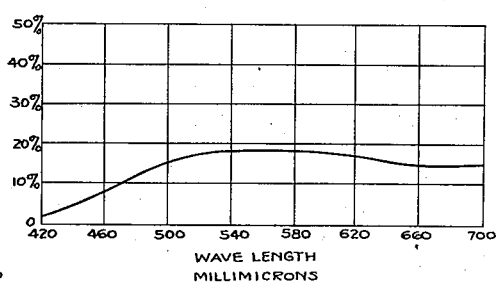
Fig. IX
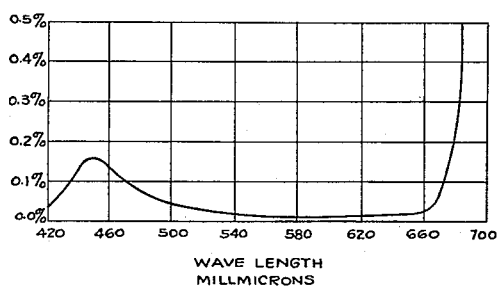
Fig. X
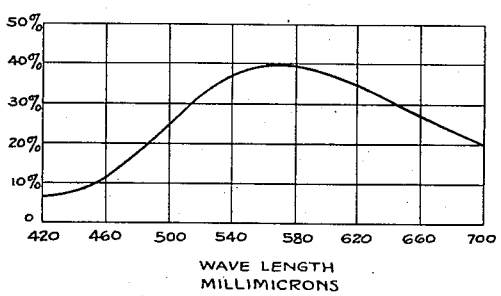
Fig. XI March 6, 1945.  E. D. TILLYER  2,370,697
OPTICAL MEANS
Filed Sept. 13, 1940  3 Sheets-Sheet 3
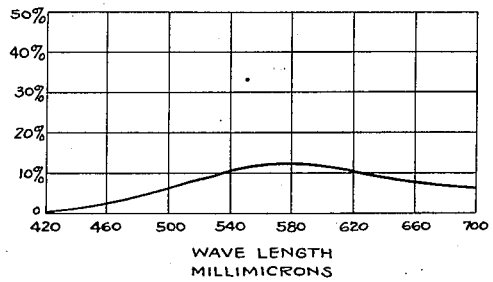
Fig. XII
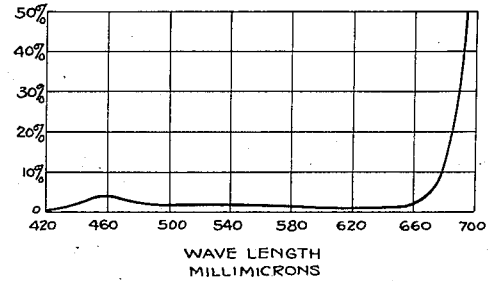
Fig. XIII
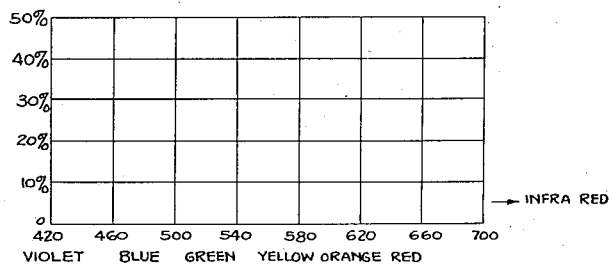
Fig. XIV
INVENTOR.
EDGAR D. TILLYER
BY
ATTORNEY.

Patented Mar. 6, 1945

2,370,697

UNITED STATES PATENT OFFICE 2,370,697

OPTICAL MEANS

Edgar D. Tillyer, Southbridge, Mass., assignor to American Optical Company, Southbridge, Mass., a voluntary association of Massachusetts Application September 13, 1940, Serial No. 356,679

6 Claims. (Cl. 88—65)

This invention relates to improvements in optical mountings and devices employing means for polarizing light and particularly to means for improving the light transmission of such devices.

A principal object of the invention is the provision of means that in combination with means for polarizing light will improve the light transmission of the same.

Another object of the invention is to provide improved means of increasing the retardation of certain selected rays of light of a light polarizing medium.

Another object of the invention is to provide improved processes for increasing the retardation of certain selected rays of light of a light polarizing medium.

Another object of the invention is to provide simple, efficient and economic means of polarizing light and at the same time increasing the retardation of certain selected rays of light to improve the light transmission of the polarizing means.

Other objects and advantages of the invention will become apparent from the following description taken in conjunction with the accompanying drawings. It will be apparent that many changes may be made in the details of construction and in the arrangement of parts without departing from the invention as set forth in the accompanying claims. It is therefore not desired to limit the invention to the exact matters shown and described as the preferred forms only have been set forth by way of illustration.

Referring to the drawings:

Fig. I is a front view of an ophthalmic mounting embodying the invention;

Fig. II is a top view of Fig. I;

Fig. III is a front view of a rimless ophthalmic mounting embodying the invention;

Fig. IV is a vertical cross section through a lens for an ophthalmic mounting embodying the invention;

Fig. V is a vertical cross section through a laminated lens for an ophthalmic mounting embodying another form of the invention;

Fig. VI is a diagrammatic figure showing a chart of the curve of Polaroid transmission between wave lengths 420 and 700 millimicrons, the Polaroid arranged with its axis of polarization parallel with the axis of polarization of the incident polarized light;

Fig. VII is a diagrammatic figure showing a chart of the curve of Polaroid transmission between wave lengths 420 to 700 millimicrons, the Polaroid arranged with its axis of polarization at right angles to the axis of polarization of the incident polarized light;

Fig. VIII is a diagrammatic figure showing a chart of the transmission between wave lengths 420 to 700 millimicrons of a glass medium having the property of cutting down the transmission at the red end of spectrum;

Fig. IX is a diagrammatic figure showing the curve of transmission of the combined mediums of Figs. VIII and VI;

Fig. X is a diagrammatic figure showing the curve of transmission of the mediums of Figs. VII and VIII;

Fig. XI is a diagrammatic figure showing the curve of transmission of another glass medium that reduces the transmission towards the red end of the spectrum;

Fig. XII is a diagrammatic figure showing the curve of transmission of the combined mediums of Figs. VI and XI;

Fig. XIII is a diagrammatic figure showing the curve of transmission of the combined mediums of Figs. VII and XI; and Fig. XIV is a diagrammatic figure showing the color scale of the charts.

In the recent development of the art artificially produced means for polarizing light have been developed to a high state of perfection and they have gone into large and extensive commercial use. The medium consists of a multiplicity of light polarizing crystals held in an acetate film with their axes of polarization oriented in parallelism. A form of this medium known as Polaroid is on the commercial market. While this medium performs admirably from the standpoint of light polarization there are present in it certain difficulties as regards the light transmission at certain sections of the spectrum. Ultra violet light has been found to deteriorate the Polaroid material or medium, it bleaches the dye with which this medium is sometimes tinted and this medium is nonresistant to infra red light transmission. It is important for many uses that these difficulties be improved or overcome, and it is therefore a principal object of this invention to improve the light transmission of devices employing this light polarizing medium.

Referring to the drawings in which similar reference characters denote corresponding parts throughout:

In Fig. I is shown an ophthalmic mounting embodying the invention and comprising lens holding rims I holding spaced aligned lenses 2 in which the light polarizing means is incorporated as will be described hereafter. The rims 1 are held in alignment by a bridge member 3. Nose guards 4 are supported by the guard arms 5 so the guards may bear on the sides of the nose when the device is in place in the face. The device is supported on the face by the temples 6, pivoted to the endpieces 7 at the points 8. The construction shown in this figure is a rimmed spectacle frame or ophthalmic mounting. Other forms of mounting may be employed such as the rimless form shown in Fig. III where the lenses 2 are not held by rims but by lens connections 9 secured to the lenses 2 by the screw connections 10, the bridge 3 is secured to the lens connections 9 on the nasal sides, and the temples 6 are pivotally connected to the lens connections 9 on the temple sides. The guards 4 are held by the arms 5 secured also to the lens connections on the nasal sides. The polarizing lenses may be held in any preferred type of mounting for spectacles, eye glasses, goggles or other desired holders and lens cells. The use of the polarizing medium has a very wide use in the arts and sciences and may be employed in many various instrumentalities where it is desired to work with polarized light.

In Fig. IV is shown a cross section of a laminated lens embodying the invention. The polarizing lamina or layer 11 is a colloidal light transmitting suspension containing a mass of relatively small polarizing bodies which are oriented in a field of force so that the polarizing axes of the polarizing bodies are in alignment or substantially parallel. The medium shown is made of commercial Polaroid. This medium is made of cellulose acetate dissolved in butyl acetate, bisulphate of quinine dissolved in methyl alcohol combined with an iodine solution dissolved in methyl alcohol, set and hardened.

The layer 11 is held between the layers 12 and 13 of glass of compositions to be described hereafter by the bonding layers 14 which are of a polyvinyl acetal mixed with a plasticizing agent, castor oil, and mixed with hydroquinone which acts as an anti-oxidant and prevents discoloration. This bonding layer is of first importance because it must bond completely with the glass layers on the one side and with the polarizing mediums on the other. This bonding medium has been found very satisfactory in use.

The outer layer 12 is made of a glass of a composition that is very retardent to ultra violet and infra red transmission but with a higher or good transmission in the green, or of a glass that is particularly good in the retardance of the infra red transmission.

The first of these glasses is substantially of the following composition:

| Ingredient | Shade 1 | Shade 2 | Shade 3 |
|---|---|---|---|
| | Per cent | Per cent | Per cent |
| $SiO_2$ | 70.69 | 70.70 | 70.38 |
| $B_2O_3$ | 1.99 | 1.99 | 1.99 |
| CaO | 1.74 | 3.69 | 5.04 |
| $Na_2O$ | 15.40 | 15.42 | 15.35 |
| $FeO_3$ | 5.16 | 3.18 | 2.25 |
| $Na_2SO_4$ | .85 | .85 | .85 |
| $As_2O_3$ | .35 | .35 | .35 |
| $CeO_2$ | 2.97 | 2.97 | 2.95 |

This glass is of a green shade. It is a silicon glass containing sodium, iron and cerium. The iron in ferrous form is important in infra red retardation, and the cerium in the ultra violet retardation.

The transmission curve of this glass is shown in Fig. VIII. It will be noted that it has a high retardation at 420 millimicrons and 700 millimicrons wave lengths while the transmission at 540 millimicrons is very high.

The layer 13 may be of white glass or of glass of any desired color or transmission characteristics. The layers 12 and 13 may be reversed in position if desired, although the layer 12 is preferable on the side away from the eye to prevent the transmission of undesirable light to the polarizing element 11.

The second glass referred to for the layer 12 is of substantially the following composition:

| Ingredient | Shade 1 | Shade 2 | Shade 3 |
|---|---|---|---|
| | Per cent | Per cent | Per cent |
| $SiO_2$ | 72.35 | 72.04 | 71.86 |
| $Na_2O$ | 13.87 | 13.80 | 13.77 |
| CaO | 8.24 | 5.78 | |
| $Na_2SO_4$ | 0.87 | 0.86 | |
| NaCl | 0.87 | 0.86 | |
| $Fe_2O_3$ | 3.62 | 6.48 | |
| $As_2O_3$ | 0.18 | 0.18 | |

This glass is dark green. It is a silica soda glass containing iron. Its light transmission curve is shown in Fig. XI. It will be noted it has a high retardance at 700 millimicrons and high transmission at 580 millimicrons. This glass gives particularly good results where used in cutting down excessive heat as in welding and before furnaces, etc.

In Fig. V the parts of the laminated light transmitting member of Fig IV are shown in aligned position but the various lamina separated from each other. In making the light transmitting member the inner glass surfaces are ground and polished to finished lens surfaces, the parts are assembled in aligned position and pressed together under the action of heat and pressure to unite them into a composite whole with all the parts retained in aligned position. The outer surfaces are ground and polished to finished optical surfaces of required power.

In Fig. VI is shown the transmission curve of the Polaroid, or light polarizing medium with its axes of polarization parallel to the axes of polarization of the incident polarized light.

In Fig. VII is shown the transmission curve of the Polaroid, or light polarizing medium with its axes of polarization at right angles to the axes of polarization of the incident polarized light.

In Fig. VI it will be noted that the transmission rises rapidly from 5% at 420 millimicrons to about 27% at 500 millimicrons then is fairly constant to 660 millimicrons and rises sharply from 660 to 700 millimicrons. The rise at the red end is very sharp.

In Fig. VIII is shown the transmission curve of the glass for the layer 12, of the first formula given namely the silica, iron, cerium glass. It will be noted that this curve rises sharply from 33% to 420 millimicrons to about 60% at about 560 millimicrons and then descends to about 40% at 700 millimicrons. It has a good retardance on both the violet and red ends.

In Fig. IX is shown the transmission curve of the combined mediums of Figs. VI and VIII. It will be noted that the transmission of about 35%—Fig. VI—between 660 and 700 millimicrons has been reduced to about 15%.

In Fig. X is shown the transmission curve of the combined mediums of Figs. VIII and VII.

In Fig. VII it will be noted that there is a very sharp rise in the transmission from 0.1% at 420 millimicrons to about 0.37% at about 450 millimicrons and then descending sharply to about 0.03% at about 640 millimicrons then rising almost in a straight vertical line at about 665 millimicrons at the red end. This forms a sharp peak at A and a sharp rise at B.

In Fig. X is shown the curve of transmission of the mediums of Figs. VII and VIII. It will be noted that the peak at A has been greatly reduced from 0.37% to about 0.17% and the vertical rise has been widened from about 665 to about 680, thus widening the retardance band at the red end.

In Fig. XI is shown the transmission curve of the glass for the layer 12 of the second composition, namely, the silica, soda, iron glass. It rises rapidly from 7% at 420 millimicrons to about 40% at 560 millimicrons and then falls to 20% at 700 millimicrons.

In Fig. XII is shown the transmission curve of the combined mediums of Figs. VI and XI. It will be noted that it has cut the whole transmission materially almost flattening the curve and that it has cut down to about 7% at 700 millimicrons as compared with 35% of Fig. VI.

In Fig. XIII is shown the transmission curve of the combined mediums of Figs. XI and VII. It will be noted that the peak A Fig. VII has been removed and the vertical rise between 660 millimicrons and 700 has been widened to about 690 millimicrons.

In Fig. XIV the structure of the charts is shown. The vertical lines indicate millimicrons, and the horizontal lines percentages of transmission. The color scale has also been indicated under the millimicron points.

From the foregoing it will be seen that by combining the light polarizing member with these glasses the infra red transmission is decidedly reduced, supplying a deficiency for certain purposes in the polarizing member, and that improvement has also been made in the transmission of ultra violet rays which are harmful to the composition of the polarizing member and the bonding members. It will be understood that not every medium can be combined with the polarizing medium to improve its transmission curve and that this invention resides in providing means whereby the transmission curve of the polarizing member is improved as regards the retardance of the ultra violet and the infra red ends of the spectrum.

This invention provides a remedy to well recognized defects in Polaroid for certain purposes hence is of great importance in the art. The elements of the combined medium of the invention have been carefully and scientifically blended to produce a required result of great commercial use. This method of modifying the transmission curve of Polaroid to required characteristics is new, the result is new and useful of commercial importance.

From the foregoing it will be seen that I have provided simple, efficient and economical means for obtaining all the objects and advantages of the invention.

Having described my invention I claim:

1. An integral laminated light polarizing structure having increased efficiency as to transmission of unpolarized light and having infra-red absorbing characteristics comprising a film of light polarizing material which is adapted to absorb light polarized at right angles to the axis of polarization of said film with said film having, for such incident polarized light, a transmission curve passing a relatively high percentage in the red and blue portions of the spectrum of said incident polarized light, two outer protective layers of light transmitting material adhesively secured in superimposed and bonded relation with the film of light polarizing material, at least one of such outer layers containing infra-red absorbing means and having a transmission curve adapted to absorb the red and blue regions of the spectrum to an extent substantially to compensate for the red and blue transmission of the film of polarizing material for incident light polarized at right angles to the axis of polarization of the said film, the transmission curve of the composite laminated structure for such incident polarized light differing from the product of the transmission curves of said film and said outer layer when not laminated and when supported in spaced relation with each other by an amount substantially equivalent to the increased transmission resulting from the elimination of reflection loss between such internally spaced surfaces thereby increasing the efficiency of said polarizing structure as to the transmission of unpolarized light and as to the substantially total absorption of the incident light polarized at right angles to the axis of polarization of the structure as well as the absorption of infra-red radiation.

2. An integral laminated structure for controlling the transmission of light, said structure comprising a layer of light polarizing material adapted to absorb substantially all of the light rays of incident light polarized at right angles to the axis of the polarizing material in all of the visible portion of the spectrum except in one or more bands of said visible portion of the spectrum, and a layer of light transmitting material adhesively secured to the first layer of said light polarizing material and having infra-red absorbing properties and a transmission curve adapted to absorb in said band or bands transmitted by said layer of light polarizing material to an extent substantially to compensate for the transmission in said band or bands for incident light polarized at right angles to the axis of polarization of said first layer, the transmission curve of the composite laminated structure for such incident polarized light being increased to the extent of elimination of the reflection loss which would result from such layers if supported in spaced relation with each other thereby increasing the efficiency of said laminated structure as to the transmission of unpolarized light and as to the substantially total absorption of the incident polarized light at right angles to the axis of polarization of the structure as well as the absorption of infra-red radiation.

3. An integral laminated structure for controlling the transmission of light, said structure comprising a layer of light polarizing material adapted to absorb substantially all of the light rays of incident light polarized at right angles to the axis of the polarizing material in all of the visible portion of the spectrum except in one or more bands of said visible portion of the spectrum, sandwiched between and laminated with outer protective layers of light transmitting material, one of said outer layers having infra-red absorbing properties and a transmission curve adapted to absorb in said band or bands transmitted by said first layer of light polarizing material to an extent substantially to compensate for the transmission in said band or bands by said first layer of polarizing material for incident light polarized at right angles to the axis of polarization of said first layer, the transmission curve of the composite laminated structure for such incident polarized light being increased to the extent of elimination of the reflection loss which would result from such layers if supported in spaced relation with each other thereby increasing the efficiency of said laminated structure as to the transmission of unpolarized light and as to the substantially total absorption of the incident polarized light at right angles to the axis of polarization of the structure as well as the absorption of infra-red radiation.

4. An integral laminated structure for controlling the transmission of light, said structure comprising a layer of light polarizing material adapted to absorb substantially all of the light rays of incident light polarized at right angles to the axis of the polarizing material in all of the visible portion of the spectrum except in one or more bands of said visible portion of the spectrum, sandwiched between and laminated with outer protective layers of light transmitting material, one of said outer layers being formed of glass having infra-red absorbing properties and a transmission curve adapted to absorb in said band or bands transmitted by said first layer of light polarizing material to an extent substantially to compensate for the transmission in said band or bands by said first layer of polarizing material for incident light polarized at right angles to the axis of polarization of said first layer, the transmission curve of the composite laminated structure for such incident polarized light being increased to the extent of elimination of the reflection loss which would result from such layers if supported in spaced relation with each other thereby increasing the efficiency of said laminated structure as to the transmission of unpolarized light and as to the substantially total absorption of the incident polarized light at right angles to the axis of polarization of the structure as well as the absorption of infra-red radiation.

5. An integral laminated light-polarizing structure having increased efficiency as to transmission of unpolarized light and having infra-red absorbing characteristics, comprising a film of light-polarizing material which is adapted to absorb light polarized at right angles to the axis of polarization thereof, said film absorbing such unpolarized light to a lesser extent in the red and blue portions of the spectrum than in the other portions thereof, two outer protective layers of light-transmitting material adhesively secured in superimposed and bonded relation with the film of light-polarizing material, at least one of such layers containing infra-red absorbing means, the layer containing the infra-red absorbing means also absorbing the red and blue portions of the spectrum to an extent substantially to compensate for the red and blue transmission of the polarizing film for incident light polarized at right angles to the axis of polarization of said film, the transmission curve of the composite laminated structure for such incident polarized light differing from the product of the transmission curves of said film and said outer layers when not laminated and when supported in spaced relation with each other by an amount substantially equivalent to the increased transmission resulting from the elimination of reflection loss between such internally spaced surfaces, thereby increasing the efficiency of said polarizing structure as to the transmission of unpolarized light and as to the substantially total absorption of incident light polarized at right angles to the axis of polarization of the structure as well as the absorption of infra-red radiation.

6. An integral laminated light-polarizing structure having increased efficiency as to transmission of unpolarized light and having infra-red absorbing characteristics, comprising a film of material which polarizes light to a lesser extent in the blue and red portions of the spectrum than in the other portions thereof, said film being sandwiched between and laminated with outer protective layers of light-transmitting material, at least one of said outer layers containing infra-red absorbing means and having characteristics for reducing the transmission of the red and blue portions of the spectrum, the resultant laminated structure being such as to absorb substantially uniformly light polarized at right angles to the axis of polarization of said polarizing film and to absorb infra-red radiation and having increased transmission as to unpolarized light by an amount substantially equal to the loss of transmission which would result from supporting layers having the above characteristics in spaced relation with each other, thereby increasing the efficiency of said structure as to the transmission of unpolarized light and as to the substantially total absorption of incident light polarized at right angles to the axis of polarization of the structure as well as the absorption of infra-red radiation.

EDGAR D. TILLYER.